United States Patent [19]

Moritz

[11] Patent Number: 4,570,437
[45] Date of Patent: Feb. 18, 1986

[54] ENERGY CONDUCTOR CHAIN

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 611,416

[22] Filed: May 17, 1984

[30] Foreign Application Priority Data

May 20, 1983 [DE] Fed. Rep. of Germany ....... 3318365

[51] Int. Cl.⁴ .............................................. F16G 13/00
[52] U.S. Cl. ...................................... 59/78.1; 59/900; 16/266; 16/267; 248/49; 292/304
[58] Field of Search ................. 59/78.1, 900; 403/383, 403/353; 248/49, 51, 68.1; 16/266, 267, 231; 292/304, 210

[56] References Cited

U.S. PATENT DOCUMENTS

| | | | |
|---|---|---|---|
| 2,288,926 | 7/1942 | Strader | 292/304 |
| 2,539,891 | 1/1951 | Carr et al. | 59/80 |
| 3,197,954 | 8/1965 | Merker et al. | 59/78.1 |
| 3,462,179 | 8/1969 | Hinkle | 16/266 |
| 3,471,874 | 10/1969 | Dixon | 16/266 |
| 3,473,769 | 10/1969 | James | 59/78.1 |
| 3,779,003 | 12/1973 | Boissevain | 59/78.1 |
| 4,174,860 | 11/1979 | Shea | 292/210 |

FOREIGN PATENT DOCUMENTS 2255283 6/1975 Fed. Rep. of Germany ....... 59/78.1
1932428 5/1977 Fed. Rep. of Germany ....... 59/78.1

Primary Examiner—Daniel C. Crane
Assistant Examiner—David B. Jones
Attorney, Agent, or Firm—Martin A. Farber

[57] ABSTRACT

An energy conductor chain for guiding energy conduits (6), particularly cables or hoses, from a fixed attachment point to a movable consuming load, comprises a plurality of chain links (A to E) formed by two outer plates (2, 3) which are connected with each other by a divisible bar, the mutual angle of swing of the adjacent chain links being limited by stops (9). In order to create an energy conductor chain of plastic which consists of only a few individual parts and which can be opened and closed without special tools, each chain link (A to E) is formed of a U-shaped receiving part (1) which is as a single piece of stable form and whose legs form the two outer plates (2, 3), and a closure yoke (5) which can be connected to the free edges of the outer plates (2, 3). The yoke is pivoted to the outer plate (3) by a joint and can be locked by an elastic hook (12) to the other outer plate (2).

11 Claims, 7 Drawing Figures

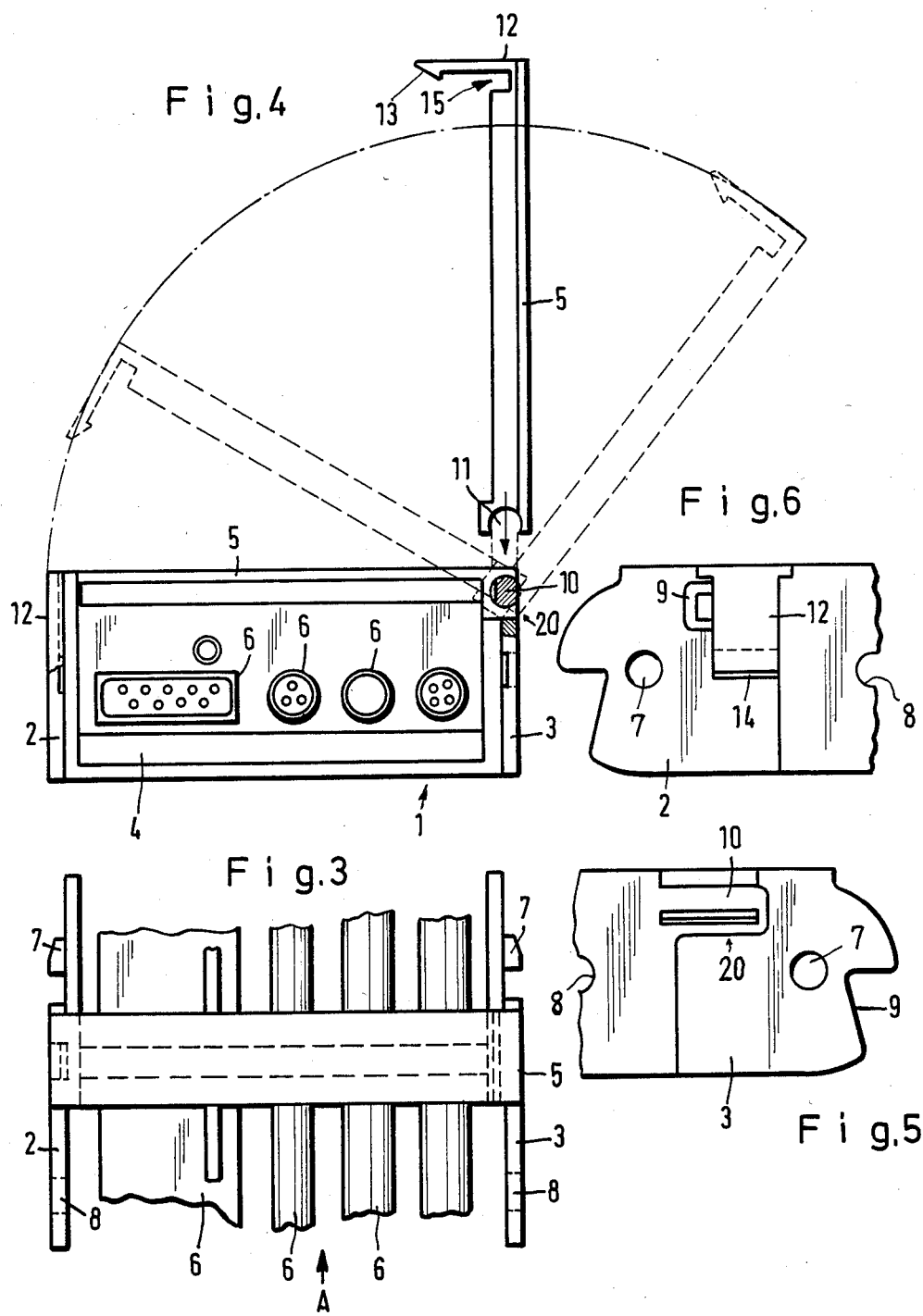

4,570,437

ENERGY CONDUCTOR CHAIN

FIELD AND BACKGROUND OF THE INVENTION

The present invention relates to an energy conductor chain for supporting and guiding energy conduits, particularly cables or hoses, from a fixed point of attachment to a movable energy consuming load, comprising a plurality of chain links which are formed by two outer plates which are connected to each other by a divisible bar, the mutual angle of swing between them being limited by stops.

BACKGROUND ART

Such energy conductor chains are known from Federal Republic of Germany Pat. No. 22 55 283. In those energy conductor chains the outer plates which are provided with stops are connected to divisible bars which consist of at least two cross members and, between them, separating stays for the energy conduits. The cross members have a flattened cross section with rounded narrow sides and the upper and lower ends of the separating bars are provided with undercut cutouts so that, after insertion into the cutouts, the cross members can be clamped in force-locked and form-locked manner to the separating stays by turning around their longitudinal axis. In this energy conductor chain, which has proven excellent in practice for cables or hoses of large weight and large freely-supported lengths, the outer plates and the cross members are made from metal for reasons of stability, while the separating stays can be formed of molded plastic. One disadvantage of these known energy conductor chains is that their chain links must be assembled from a large number of individual parts. From Federal Republic of Germany Pat. No. 19 32 428, there is also known an energy conductor chain for cables and hoses of low weight and small length whose chain links are formed in one piece from plastic. In the case of this energy conductor chain, the stays cannot be opened so that in order to replace defective chain links. It is necessary to open the connections of the energy conduits in order to be able to insert a new chain link. Furthermore, with this energy conductor chain with undivided chain links it is difficult to pull the energy conduits in and to replace individual energy conduits.

Accordingly it is an object of the invention to create an energy conductor chain of plastic which is of simple construction and whose chain links consist of the fewest possible number of individual parts and can be opened and closed in order to exchange or replace the energy conduits without the use of special tools.

SUMMARY OF THE INVENTION

According to the invention each chain link is formed of a U-shaped receiving part made of a single piece of dimensional stability, the legs of which form the two outer plates, and of a closure yoke which can be connected to the free edges of the outer plates, the yoke being pivoted to one of the outer plate by a joint or articulation and being adapted to be locked to the other outer plate by resilient hook.

In one practical embodiment, the joint between the receiving part and the closing yoke comprises a pivot pin which freely extends in the free edge of one outer plate and has a flattened cross section and rounded narrow sides and an undercut cutout which is formed in the end of the closure yoke. This construction of the joint makes it possible to manufacture the receiving part and the closure yoke separately and to clamp the closure yoke in force-locked and form-locked manner to the pivot pin after the yoke has been placed on the pivot pin and swung in the direction towards the opposite outer plate.

So that the closure yoke cannot move out of its assembled position and unintentionally open, the resilient hook can be provided at its end with a projection via which it engages in a recess in the opposite outer plate. Furthermore a groove can be arranged in the closure yoke at the base of the hook, into which groove the free edge of the outer plate engages, so that the outer plates of a chain link can no longer move relative to each other after the assembling of the closure yoke.

The chain links of an energy conductor chain developed in accordance with the invention consist of only two individual parts, which may be made of plastic in separate operations. Upon their intended use, there is the outstanding advantage that a defective chain link can be removed from the chain by opening the closure yoke and replaced by a new chain link. For this, it is no longer necessary to detach the energy conduits on one attachment side in order to be able to install a new chain link. Furthermore, there is the important advantage that the energy conduits can be inserted more easily into the energy conductor chain and that the replacement of an energy conduit can also be effected more rapidly.

Further details and advantages of the subject matter of the invention will be apparent from the following description of the drawings in which a preferred embodiment of the invention has been shown.

BRIEF DESCRIPTION OF THE DRAWINGS

FIG. 3 shows a chain link on a larger scale in top view;

FIG. 4 shows in partial section the chain link of FIG. 3 from the A direction with the closing yoke closed and opened, seen in the direction of the energy conduits;

FIG. 5 shows the chain link of FIG. 3 with closure yoke closed, seen from its hinge side;

FIG. 6 shows the same chain link of FIG. 3 seen from its closure side; and

DETAILED DESCRIPTION OF THE PREFERRED EMBODIMENT

Figure 1:
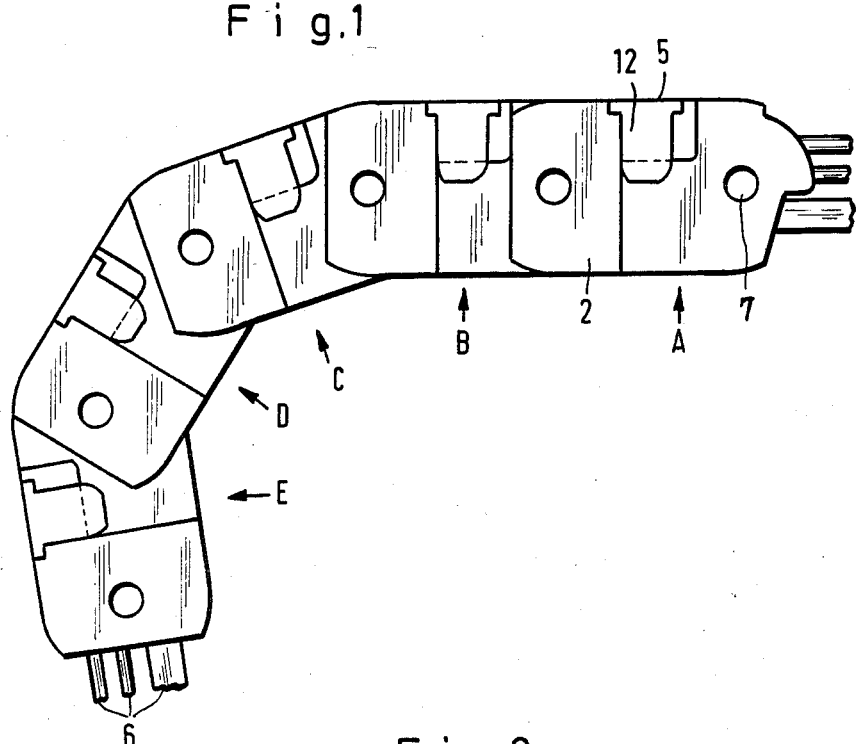
FIG. 1 shows a section of an energy conductor chain having a plurality of chain links bent at an angle to each other, in side view.
Figure 2:
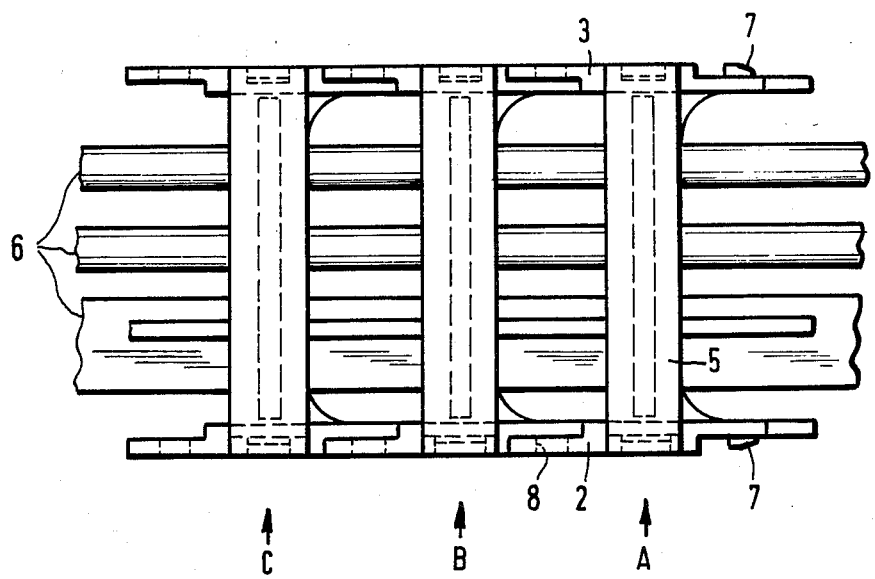
FIG. 2 shows a portion of the energy conductor chain in top view.
Figure 7:
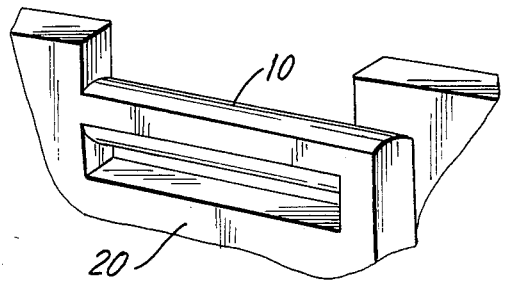
FIG. 7 is a broken away perspective view of one of the plates showing the hinge pin.

Each chain link A, B, C, D, E consists of a U-shaped receiving part 1 having two outer plates 2, 3 and a cross member 4 which connects them together so as to form a single piece, as well as a closure yoke 5. These structural parts surround an opening for the insertion of energy conduits 6. The ends of the outer plates 2, 3 are resiliently yieldable so that the individual chain links can be pushed together to form a link chain, pivot pin 7 which are beveled on their front side engaging in pivot holes 8 in the outer plates 2, 3.

The mutual angle of swing between two adjacent chain links A to B is limited by stops 9.

In the free edge of the outer plate 3, approximately in its center, there is formed a freely extending projection 20 forming a hinge pin 10 which has a flattened cross section and rounded narrow sides. An undercut edge cutout 11 provided in the end of the closure yoke 5 cooperates with said hinge pin 10. The width of the mouth of the cutout 11 is just sufficiently large that the closure yoke 5 can be pushed in its opened position over the hinge pin 10. When the attached closure yoke 5 is swung in the direction towards the opposite outer plate 2 into its closed position, the hinge pin 10 is combination with the recess 11, forms a force-locked (by application of force) and form-locked (by the shape of the parts) hinge by which the closure yoke 5 is pivoted to the receiving part 1.

On its free end, the closure yoke 5 has a hook 12 with a projection 13 which can engage into a recess 14 on the outer plate 2. At the base of the hook 12 a groove 15 is formed in the closure yoke 5, into which groove the free upper edge of the outer plate 2 can engage so that relative movement is prevented between the outer plates 2 and 3 when the closure yoke 5 is engaged.

I claim:

1. In a chain for supporting energy conduits from an attachment point to a movable consuming load, comprising a plurality of chain links, wherein each of the chain links comprises a U-shaped receiving part which is formed as a single piece of stable shape, said U-shaped receiving part has legs which form two outer plates and a first cross member connecting said plates together, said plates of adjacent chain links overlap and are releasably pivotally directly connected to each other, said plates forming stops for limiting a mutual angle of swing with respect to the adjacent chain links, the improvement comprising a removable second cross-member comprising a closure yoke which is pivoted via a joint to one of said outer plates and has a resilient hook for releasably locking said closure yoke to the other of said outer plates, and said joint comprises a hinge pin which freely extends on a free edge of said one outer plate, said hinge pin having a flattened cross section with rounded sides, and one end of said closure yoke remote from said hook is formed with an undercut edge opening, said hinge pin removably engages in said opening.

2. The chain according to claim 1, wherein
said closure yoke is swingably engageable on said hinge pin,
said closure yoke clamps in force-locked and form-locked manner to said hinge pin connecting said plates via said hinge pin and said resilient hook locking said closure yoke to the other of said outer plates.

3. The chain according to claim 1, wherein
said resilient hook has a projection,
said other plate is formed with a recess,
said projection is engageable into said recess.

4. The chain according to claim 1, wherein
said closure yoke at a base of said resilient hook is formed with a groove into which the free edge of said other outer plate engages into said groove.

5. The chain according to claim 1, wherein
each said chain link consists of said receiving part and said closure yoke.

6. The chain according to claim 1, wherein
said hinge pin is flattened on at least one side.

7. The chain according to claim 6, wherein
said at least one side of said hinge pin extends parallel to said plates.

8. The chain according to claim 2, wherein
said undercut edge opening is formed of a resilient portion of said closure yoke and is resiliently expandable for the force-locked clamping as said closure yoke is swung toward said other outer plate.

9. The chain according to claim 1, wherein
said closure yoke is positionable on said hinge pin and swung into a position locking said closure yoke to the other of said outer plates and clamping in force-locked and form-locked manner on said hinge pin.

10. The chain according to claim 1, wherein
said outer plates of each of said chain links are spaced apart from each other at two different distances respectively between two different adjacent of said chain links, constituting different end portions of each said chain link,
one of said end portions is formed with a pivot pin and the other of said end portions is formed with pivot holes in which the pivot pin of the adjacent chain link pivotally extends,
said ends of said plates are resiliently yieldable so that said chain links are pushable together and removeable from each other in the chain, and
said closure yoke is disposed centrally in said chain link between said end portions spaced apart from said pivot pins and said pivot holes.

11. The chain according to claim 7, wherein
said undercut edge opening has a radius of curvature substantially equal to but snugly slightly less than that of said rounded sides of said hinge pin and is truncated forming an insertion outlet such that said undercut edge opening extends somewhat greater than 180°,
said closure yoke extending longitudinally away from and in a direction diametrically opposite said insertion outlet.

* * * * *